(12) United States Patent
Wei et al.

(10) Patent No.: US 11,909,242 B2
(45) Date of Patent: Feb. 20, 2024

(54) HIGH-VOLTAGE DRIVER SWITCH SYSTEM AND SWITCHING METHOD

(71) Applicant: Globe (Jiangsu) Co., Ltd, Jiangsu (CN)

(72) Inventors: Zefeng Wei, Jiangsu (CN); Biao Li, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 583 days.

(21) Appl. No.: 17/121,652

(22) Filed: Dec. 14, 2020

(65) Prior Publication Data

US 2021/0184483 A1 Jun. 17, 2021

(30) Foreign Application Priority Data

Dec. 13, 2019 (CN) .......................... 201911279948.4

(51) Int. Cl.
*H02J 7/00* (2006.01)
*H02J 7/34* (2006.01)
*H02P 27/06* (2006.01)

(52) U.S. Cl.
CPC ............ *H02J 7/0068* (2013.01); *H02J 7/345* (2013.01); *H02J 2207/50* (2020.01); *H02P 27/06* (2013.01)

(58) Field of Classification Search
CPC .......... B60L 53/10; B60L 53/18; B60L 53/50; B60L 53/60; B60L 53/62; B60L 53/63;
(Continued)

(56) References Cited

U.S. PATENT DOCUMENTS

| 5,619,076 A * | 4/1997 | Layden | H02H 9/001 307/134 |
| 2003/0137791 A1* | 7/2003 | Arnet | H02H 9/001 361/93.9 |

(Continued)

FOREIGN PATENT DOCUMENTS

| CN | 106564396 A | 4/2017 |
| CN | 206341169 U | 7/2017 |
| CN | 208241390 U | 12/2018 |

OTHER PUBLICATIONS

Extended European Search Report of counterpart European Patent Application No. 20213905.1 dated Apr. 13, 2021.

*Primary Examiner* — Richard Isla
*Assistant Examiner* — Johali A Torres Ruiz

(57) ABSTRACT

The invention discloses a high-voltage driver switch system and switching method. The system includes a main control chip module and an energy storage capacitor connected with a battery pack, a drive circuit module, a pre-charge circuit and a charge circuit for charging the energy storage capacitor. The pre-charge circuit is connected with the main control chip module and has a current limit resistor, so as to pre-charge the energy storage capacitor under the control of the main control chip module. The charge circuit is connected with the main control chip module and has an electronic switch module which includes two ends connected respectively with the battery pack and the energy storage capacitor, the battery pack charges the energy storage capacitor when switched-on. The invention reduces the instantaneous start-up current and avoids a high current impact caused by charging the energy storage capacitor by the battery pack directly.

14 Claims, 1 Drawing Sheet

(58) Field of Classification Search
CPC ......... B60L 53/64; B60L 53/65; B60L 53/66; H02J 3/14; H02J 7/04; H02J 7/12; H02J 7/0036; H02J 7/0047; H02J 7/007; H02J 7/00712; H02J 2207/20; H02J 2310/12; H02J 2310/48; Y02T 10/70; Y02T 10/7072; Y02T 90/12; Y02T 90/14; Y02T 90/16; Y02T 90/167
See application file for complete search history.

(56) References Cited

U.S. PATENT DOCUMENTS

| | | | |
|---|---|---|---|
| 2005/0014602 A1* | 1/2005 | Hara | B60W 10/08 |
| | | | 477/3 |
| 2005/0201032 A1* | 9/2005 | Devine | H02H 3/087 |
| | | | 361/93.1 |
| 2006/0220601 A1 | 10/2006 | Horii | |
| 2015/0015191 A1* | 1/2015 | Kim | H02J 7/00 |
| | | | 320/155 |
| 2017/0338753 A1 | 11/2017 | Forster et al. | |
| 2020/0076295 A1* | 3/2020 | Nohata | H02M 1/36 |
| 2020/0078897 A1 | 3/2020 | Ypma | |
| 2021/0111578 A1* | 4/2021 | Ou | G06F 1/266 |

* cited by examiner

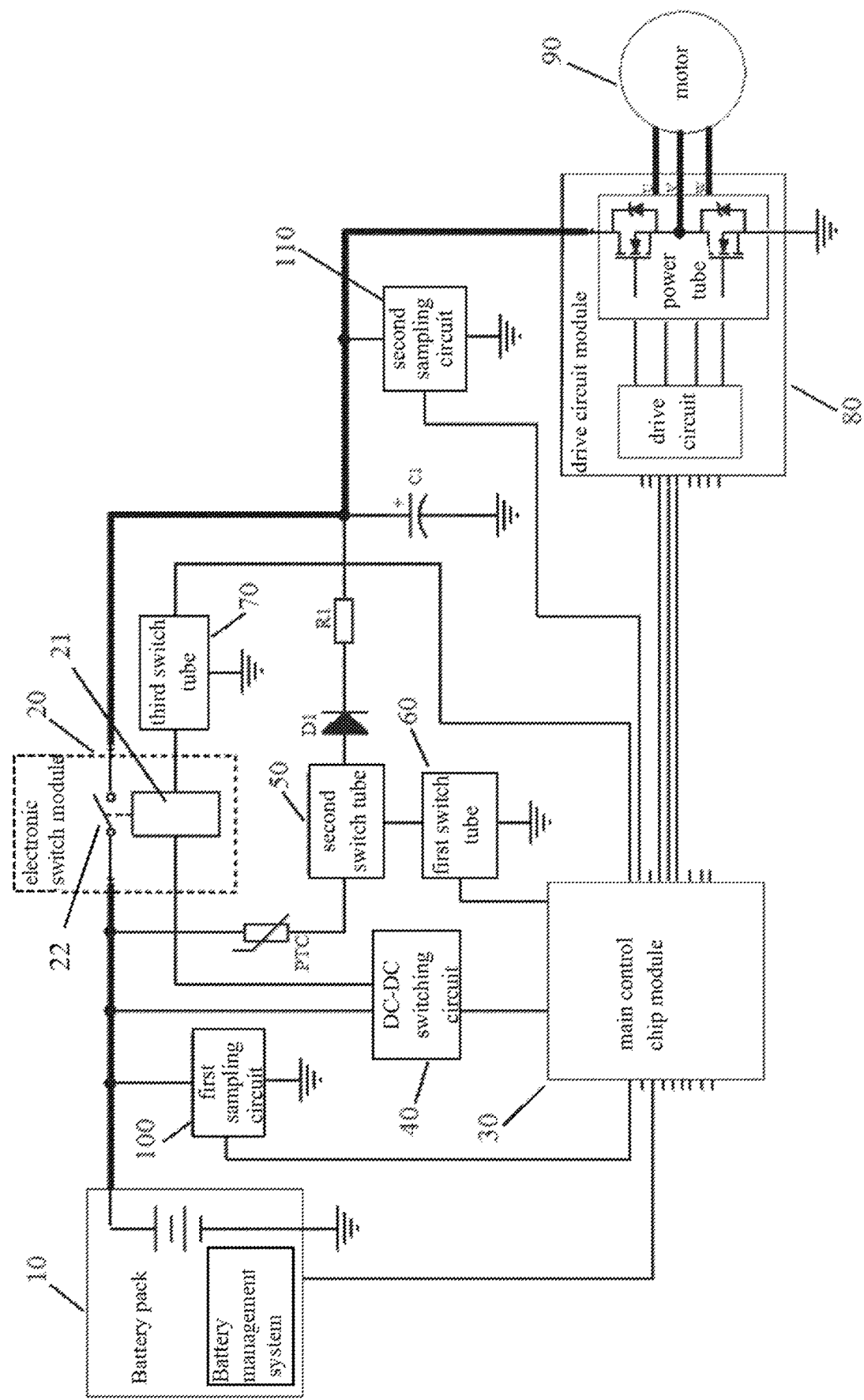

HIGH-VOLTAGE DRIVER SWITCH SYSTEM AND SWITCHING METHOD

CROSS-REFERENCE TO RELATED INVENTIONS

This invention is a US application which claims the priority of CN application Serial No. 201911279948.4, filed on Dec. 13, 2019, the disclosures of which are hereby incorporated by reference in their entirety.

TECHNICAL FIELD

The present invention relates to a high-voltage driver switch system and switching method.

BACKGROUND ART

Currently, as for gardening tools, power tools and so on, some of the internal motor drive controllers have fuses added to the main circuit thereof for protection, and some are not added, which will cause large problems during work, especially at the moment of startup. The impulse current is easy to affect the external battery pack and the electronic switch inside the controller, which reduces the service life of the battery pack and the electronic switch.

Moreover, when the machine is turned on for the first time, it is also prone to sparks, while when it is turned off, because the plug-in socket of the external battery pack and the driver inside the controller are directly connected through the fuse, in which the internal energy storage capacitor will still retain the power that is incompletely discharged for a period of time after shutting down, so that there is a risk of residual charge in the plug-in socket of the external battery pack.

In view of the above, there is a need to provide an improved switch system to solve the problem.

SUMMARY OF INVENTION

One objective of the present invention is to provide a high-voltage driver switch system, which can reduce the instantaneous current when powered-on, and avoid high current impact caused by charging the energy storage capacitor by the external battery pack directly.

In order to achieve the above object, the present invention provides a high-voltage driver switch system, including: a main control chip module and an energy storage capacitor connected with a battery pack, and a drive circuit module respectively connected with the main control chip module and the battery pack, a pre-charge circuit and a charge circuit both for charging the energy storage capacitor, the pre-charge circuit which includes a current limit resistor connected with the main control chip module to pre-charge the energy storage capacitor under the control of the main control chip module, the charge circuit connected with the main control chip module and having an electronic switch module which includes two ends connected respectively with the battery pack and the energy storage capacitor, the battery pack is able to charge the energy storage capacitor when the electronic switch module is switched on by the main control chip module, a first sampling circuit being provided between the electronic switch module and the battery pack and a second sampling circuit being provide between the electronic switch module and the drive circuit module, and feedback terminals of the first sampling circuit and the second sampling circuit both connected with the main control chip module.

As a further improvement of the invention, the pre-charge circuit further include a first switch tube, a PTC thermistor, a second switch tube, a rectifier tube, and in where the first switch tube is connected with the main control chip module, the second switch tube is connected with the first switch tube, and in where the PTC thermistor, the second switch tube, the rectifier tube and the current limit resistor connect in order, and in where the other end of the PTC thermistor connects with a positive output of the battery pack, and the other end of the current limit resistor connects with the positive electrode of the energy storage capacitor.

As a further improvement of the invention, the pre-charge circuit and the energy storage capacitor are connected in series and constitute an integral circuit.

As a further improvement of the invention, the pre-charge circuit is turned on by a single pulse sent from the main control chip module to charge the energy storage capacitor for the first time; and the main control chip module is not allowed to send the single pulse to the pre-charge circuit again after sending the single pulse.

As a further improvement of the invention, the charge circuit also includes a third switch tube connected with the electronic switch module, the third switch tube connected with the main control chip module to receive a control signal sent from the main control chip module so as to switch on or switch off the electronic switch module.

As a further improvement of the invention, the electronic switch module includes a control terminal connected to the third switch tube and a switch terminal electrically connected to the control terminal, and in where when the third switch tube is switched on, the control terminal forms an energized circuit to switch on the switch terminal, so that the battery pack, the switch terminal and the energy storage capacitor are electrically connected and the battery pack starts to charges the energy storage capacitor.

As a further improvement of the invention, the pre-charge circuit charges the energy storage capacitor for the first time after being turned on by a single pulse sent from the main control chip module, and when the main control chip module determines that voltage sampling values sampled respectively by the second sampling circuit and the first sampling circuit are the same, and a charging voltage of the energy storage capacitor is equal to a voltage of the battery pack, and the main control chip module sends a control signal to the third switch tube.

As a further improvement of the invention, the main control chip module is integrated with pre-programmed power-on sequential logic, power-off sequential logic and drive signal logic.

In order to achieve the object, the present invention also provides a switching method of a high-voltage driver switch system, the present invention provides a high-voltage driver switch system, including: a main control chip module and an energy storage capacitor connected with a battery pack, and a drive circuit module respectively connected with the main control chip module and the battery pack, a pre-charge circuit and a charge circuit both for charging the energy storage capacitor, the pre-charge circuit which includes a current limit resistor connected with the main control chip module to pre-charge the energy storage capacitor under the control of the main control chip module, the charge circuit connected with the main control chip module and having an electronic switch module which includes two ends connected respectively with the battery pack and the energy storage capacitor, the battery pack is able to charge the energy storage capacitor when the electronic switch module is switched on by the main control chip module, a first sampling circuit being provided between the electronic switch module and the battery pack and a second sampling circuit being provide between the electronic switch module and the drive circuit module, and feedback terminals of the first sampling circuit and the second sampling circuit both connected with the main control chip module, in where, the switching method of the high-voltage driver switch system includes a power-on method which mainly includes:

turning on the pre-charge circuit under the control of the main control chip module, charging the energy storage capacitor for the first time through the pre-charge circuit;

after the main control chip module determines that voltage sampling values sampled by the second sampling circuit and the first sampling circuit are the same, switching on the electronic switch module under the control of the main control chip module to turn on the charge circuit, charging the energy storage capacitor through the battery pack to enable the energy storage capacitor have enough power provided to the drive circuit module;

sending, by the main control chip module, a control command to the drive circuit module to make the drive circuit module work normally.

As a further improvement of the invention, the switching method of the high-voltage driver switch system further includes a power-off method which mainly includes:

turning off the drive circuit module under the control of the main control chip module;

switching off the electronic switch module of the charge circuit under the control of the main control chip module.

The beneficial effects of the present invention are: the high-voltage driver switch system of the present invention can first use the pre-charge circuit to pre-charge the energy storage capacitor, and then use the charge circuit to make the battery pack continue to charge the energy storage capacitor, so that the current limit resistor in the pre-charge circuit can be used to reduce the instantaneous start-up current, thereby avoiding a high current impact, which will burn the electronic switch module or the battery pack, caused by charging the energy storage capacitor by the external battery pack directly.

The above general description and the following detailed description are intended to be illustrative and not restrictive.

BRIEF DESCRIPTION OF DRAWINGS

The sole FIGURE is a circuit principle diagram of a high-voltage driver switch system of the present invention.

DESCRIPTION OF EMBODIMENT

The exemplary embodiment will be described in detail herein, and the embodiment is illustrated in the accompanying drawings. When the following description refers to the drawings, unless otherwise indicated, the same numbers in different drawings indicate the same or similar elements. The embodiment described in the following exemplary embodiment does not represent all embodiments consistent with present invention. On the contrary, they are only examples of devices, systems, machines, and methods consistent with some aspects of the invention as detailed in the appended claims.

Reference will now be made to the drawing FIGURES to describe the embodiments of the present disclosure in detail. In the following description, the same drawing reference numerals are used for the same elements in different drawings.

As shown in the sole FIGURE, an embodiment of the present invention discloses a high-voltage driver switch system, used to solve the risk of large startup inrush current and residual charge on the plug-in socket when the circuit on the internal main circuit of the high-voltage driver is connected to the external battery pack.

The high-voltage driver switch system includes a main control chip module 30 and an energy storage capacitor C1 which both connected to an external battery pack 10, a drive circuit module 80 respectively connected to the main control chip module 30 and the battery pack 10, and a pre-charging circuit and a charging circuit that can charge the energy storage capacitor C1. The main control chip module 30 is connected respectively with the battery pack 10, the pre-charge circuit, the charge circuit, the drive circuit module 80, a first sampling circuit 100 and a second sampling circuit 110, to thereby control the pre-charge circuit to pre-charge the energy storage capacitor C1. After a certain period of pre-charging, that is, after determining that the voltage sampling values sampled by the first sampling circuit 100 and the second sampling circuit 110 are the same, the main control chip module 30 turns on the charge circuit to make the battery pack 10 continue to charge the energy capacitor C1.

The battery pack 10, which is a detachable external battery pack, connected to an internal main circuit of the high-voltage driver, and used to supply power to the entire high-voltage driver switch system. The main control chip module 30 integrates functional programs such as pre-programmed power-on sequential logic, power-off sequential logic and drive signal logic and so on, so as to perform corresponding power-on control, shutdown control and drive control.

The drive circuit module 80 also connects with a motor 90 to control the motor 90 to star-up and shut-down. More specifically, the drive circuit module 80 includes a drive circuit and a plurality of power tubes. The drive circuit is connected with the main control chip module 30, and the plurality of power tubes are respectively connected with the drive circuit and the motor 90, so that when working, the main control module 30 sends control command to the drive circuit. The drive circuit controls the corresponding power tube to switch on or switch off according to the control command received, and then controls the motor 90 to run normally or stop running.

The pre-charge circuit includes a first switch tube 60, a PTC thermistor, a second switch tube 50, a rectifier tube D1 and a current limit resistor R1. The first switch tube 60 is connected with the main control chip module 30. The second switch tube 50 is connected with the first switch tube 60. The PTC thermistor, the second switch tube 50, the rectifier tube D1 and the current limit resistor R1 connect in order. The other end of the PTC thermistor connects with a positive output end of the battery pack 10, and the other end of the current limit resistor R1 connects with the positive electrode of the energy storage capacitor C1. It can be seen that the pre-charging circuit is connected in series with the energy storage capacitor C1 and constitutes an integral circuit, so that in the pre-charging stage, the main control chip module 30 can directly send a control command to the first switch tube 60, and then switch on the second switch tube 50. At this time, a path composed of the PTC thermistor, the rectifier tube D1 and the current limit resistor R1 is turned on, and the energy storage capacitor C1 is charged for the first time.

It should be noted that: the pre-charging circuit is controlled to turn on by the single pulse sent by the main control chip module 30 to charge the energy storage capacitor C1 for the first time; and after the single pulse transmission is over, the main control chip module 30 will not send a single pulse to the pre-charging circuit until restart for the second time. It can also be understood as that: the pre-charging circuit ends the task by only sending a pulse waveform when it is turned on.

The charge circuit includes an electronic switch module 20 and a third switch tube 70 connected to the electronic switch module 20. The third switch tube 70 is also connected to the main control chip module 30 for receiving control signals sent by the main control chip module 30, so as to control the electronic switch module 20 to be switched on or off. It should be noted that: the main control chip module 30 will send a control signal to the third switch tube 70 after a certain period of time of working of the pre-charging circuit.

The electronic switch module 20 includes a control terminal 21 connected to the third switch tube 70 and a switch terminal 22 electrically connected to the control terminal 21. When the third switch tube 70 is switched on, the control terminal 21 forms an energized circuit and absorbs the switch terminal 22 to be switched on, so that the battery pack 10, the switch terminal 22 and the energy storage capacitor C1 on the main circuit are electrically connected. Two ends of the switch terminal 22 are respectively connected to the battery pack 10 and the energy storage capacitor C1, so that when the main control chip module 30 turns on the switch terminal 22, the battery pack 10 can be used to charge the energy storage capacitor C1 directly to make the storage capacitor C1 have enough power to supply the driving circuit module 80.

The first sampling circuit 100 is arranged between the electronic switch module 20 and the battery pack 10. The second sampling circuit 110 is arranged between the electronic switch module 20 and the driving circuit module 80. Moreover, feedback terminals of the first sampling circuit 100 and the second sampling circuit 112 are respectively connected to the main control chip module 30. Specifically, a sampling point of the first sampling circuit 100 is taken from the positive output circuit of the battery pack 10, and the feedback terminal is connected to the main control chip module 30 to output the voltage sampling value of the first sampling circuit 100; the sampling point of the second sampling circuit 110 is taken from the positive bus circuit of the energy storage capacitor C1, and the feedback terminal is connected to the main control chip module 30 to output the voltage sampling value of the second sampling circuit 110.

The high-voltage driver switch system also includes a DC-DC switching circuit 40. One end of the DC-DC switching circuit 40 connects with the main control chip module 30 and the other end connects with the positive output end of the battery pack 10 and the controlling terminal 21 of the electronic switch module 20, so that the voltage output by the battery pack 10 is converted to a voltage suitable for the main control chip module 30 and the electronic switch module 20.

An embodiment of the present invention also provides a switching method for high-voltage driver switch system, which mainly includes a power-on method and a power-off method.

The power-on method mainly includes:

First step: the main control chip module 30 sends a single pulse waveform with a turn-on time of about 100 ms to the first switch tube 60, so that the first switch tube 60 is switched on and connected to ground, and the second switch tube 50 is triggered to switch on. At this time, a pre-charge circuit composed of the PTC thermistor, the first switch tube 60, the second switch tube 50, the rectifier tube D1 and the current limit resistor R1 is turned on to charge the energy storage capacitor C1 for the first time;

Second step: after a certain time interval, that is, after the main control chip module 30 determines that the voltage sampling value of the second sampling circuit 110 is the same as the voltage sampling value of the first sampling circuit 100, the charging voltage of the energy storage capacitor C1 is equal to the voltage of the battery pack 10, the main control chip module 30 then sends a control signal to the third switch tube 70 to switch on the third switch tube 70, and form an energization loop at the control terminal 21, and the switch terminal 22 is closed. At this time, the battery pack 10, the switch terminal 22 and the energy storage capacitor C1 form a path, and the battery pack 10 continues to charge the energy storage capacitor C1 so that the energy storage capacitor C1 can provide sufficient power to the drive circuit module 80.

Third step: the main control chip module 30 then send a control command to the drive circuit module 80 to drive the motor 90 to work normally.

As can be known from the pre-charge circuit in the first step: at the moment of power-on, since the capacitor in the energy storage capacitor C1 has not yet accumulated charge, the electromotive force E of the battery pack 10 all falls on the current limit resistor R1, and its maximum charging current is IO=E/R. It can be seen from this formula that: after the current limit resistor R1 limits the current, the instantaneous current at startup becomes smaller because of current limitation of the current limit resistor R1. Therefore, the current limit resistor R1 is able to effectively avoid a high current impact, which will burn the electronic switch module 20 or the battery pack 10, caused by charging the energy storage capacitor C1 through the electronic switch module 20 by the battery pack 10 directly.

The power-off method mainly includes:

First step: the main control chip module 30 controls the drive circuit module 80 to turn off, so that the motor 90 stops running;

Second step: after completing the first step, the main control chip module 30 controls the third switch tube 70 to switch off, so that the switch terminal 22 of the electronic switch module 20 is switched on. At this time, the connection between the circuit on the internal main circuit of the high-voltage driver and the battery pack 10 can be completely cut off to avoid the risk of electrification at the terminals of the plug-in socket of the battery pack 10.

In summary, the high-voltage driver switch system of the present invention can first use the pre-charge circuit to pre-charge the energy storage capacitor C1, and then use the charge circuit to make the battery pack 10 continue to charge the energy storage capacitor C1, so that the current limit resistor R1 in the pre-charge circuit can be used to reduce the instantaneous start-up current, thereby avoiding the high current impact, which will burn the electronic switch module 20 or the battery pack 10, caused by charging the energy storage capacitor C1 by the battery pack 10 directly; When powered-off, it can completely cut off the connection between the circuit on the internal main circuit of the high-voltage driver and the battery pack 10 to avoid the risk of electrification of the plug-in socket terminal of the battery pack 10.

Compared with the conventional technology, the present invention not only prolongs the service life of the battery pack 10 and the electronic switch module 20, protects personal safety, but also brings a good surge control performance. While protecting the working circuit, it effectively reduces the cost of circuit design and the cost of subsequent maintenance and greatly improves the market competitiveness.

The above embodiment is only used to illustrate present invention and not to limits the technical solutions described in present invention. The understanding of this specification should be based on those skilled in the art, although present invention has been described in detail with reference to the above embodiment. However, those skilled in the art should understand that those skilled in the art can still modify or equivalently replace present invention, and all technical solutions and improvements that do not depart from the spirit and scope of present invention should be within the scope of the claims of the invention.

What is claimed is:

1. A high-voltage driver switch system, comprising:
a main control chip module and an energy storage capacitor both connected with a battery pack, and a drive circuit module respectively connected with the main control chip module and the battery pack, a pre-charge circuit and a charge circuit both for charging the energy storage capacitor, the pre-charge circuit which comprises a current limit resistor connected with the main control chip module to pre-charge the energy storage capacitor under the control of the main control chip module, the charge circuit connected with the main control chip module and having an electronic switch module which comprises two ends connected respectively with the battery pack and the energy storage capacitor, the battery pack being able to charge the energy storage capacitor when the electronic switch module is switched on by the main control chip module, a first sampling circuit being provided between the electronic switch module and the battery pack and a second sampling circuit being provide between the electronic switch module and the drive circuit module, and feedback terminals of the first sampling circuit and the second sampling circuit both connected with the main control chip module;
wherein the pre-charge circuit further comprises a first switch tube, a PTC thermistor, a second switch tube, a rectifier tube, and wherein the first switch tube is connected with the main control chip module, the second switch tube is connected with the first switch tube, and wherein the PTC thermistor, the second switch tube, the rectifier tube and the current limit resistor connect in order, and wherein the other end of the PTC thermistor connects with a positive output end of the battery pack, and the other end of the current limit resistor connects with the positive electrode of the energy storage capacitor.

2. The high-voltage driver switch system as claimed in claim 1, wherein the pre-charge circuit and the energy storage capacitor are connected in series and constitute an integral circuit.

3. The high-voltage driver switch system as claimed in claim 1, wherein the pre-charge circuit is turned on by a single pulse sent from the main control chip module to charge the energy storage capacitor for the first time; and the main control chip module is not allowed to send the single pulse to the pre-charge circuit again after sending the single pulse.

4. The high-voltage driver switch system as claimed in claim 1, wherein the charge circuit further comprises a third switch tube connected with the electronic switch module, the third switch tube connected with the main control chip module to receive a control signal sent from the main control chip module so as to switch on or switch off the electronic switch module.

5. The high-voltage driver switch system as claimed in claim 4, wherein the electronic switch module comprises a control terminal connected to the third switch tube and a switch terminal electrically connected to the control terminal, and wherein when the third switch tube is switched on, the control terminal forms an energized circuit to switch on the switch terminal, so that the battery pack, the switch terminal and the energy storage capacitor are electrically connected and the battery pack starts to charge the energy storage capacitor.

6. The high-voltage driver switch system as claimed in claim 4, wherein the pre-charge circuit charges the energy storage capacitor for the first time after being turned on by a single pulse sent from the main control chip module, and wherein when the main control chip module determines that voltage sampling values sampled respectively by the second sampling circuit and the first sampling circuit are the same, and a charging voltage of the energy storage capacitor is equal to a voltage of the battery pack, the main control chip module sends a control signal to the third switch tube.

7. The high-voltage driver switch system as claimed in claim 1, wherein the main control chip module is integrated with pre-programmed power-on sequential logic, power-off sequential logic and drive signal logic.

8. A switching method of a high-voltage driver switch system, the high-voltage driver switch system comprising: a main control chip module and an energy storage capacitor both connected with a battery pack, and a drive circuit module respectively connected with the main control chip module and the battery pack, a pre-charge circuit and a charge circuit both for charging the energy storage capacitor, the pre-charge circuit which comprises a current limit resistor connected with the main control chip module to pre-charge the energy storage capacitor under the control of the main control chip module, the charge circuit connected with the main control chip module and having an electronic switch module which comprises two ends connected respectively with the battery pack and the energy storage capacitor, the battery pack being able to charge the energy storage capacitor when the electronic switch module is switched on by the main control chip module, a first sampling circuit being provided between the electronic switch module and the battery pack and a second sampling circuit being provide between the electronic switch module and the drive circuit module, and feedback terminals of the first sampling circuit and the second sampling circuit both connected with the main control chip module; wherein, the switching method comprises a power-on method which mainly comprises:
turning on the pre-charge circuit under the control of the main control chip module, charging the energy storage capacitor for the first time through the pre-charge circuit;
after the main control chip module determines that voltage sampling values sampled respectively by the second sampling circuit and the first sampling circuit are the same, switching on the electronic switch module under the control of the main control chip module to turn on the charge circuit, charging the energy storage capacitor through the battery pack to enable the energy storage capacitor have enough power provided to the drive circuit module;

sending, by the main control chip module, a control command to the drive circuit module to make the drive circuit module work normally;

wherein the switching method further comprises a power-off method which mainly comprises:

turning off the drive circuit module under the control of the main control chip module;

switching off the electronic switch module of the charge circuit under the control of the main control chip module;

wherein the pre-charge circuit further comprises a first switch tube, a PTC thermistor, a second switch tube, a rectifier tube, and wherein the first switch tube is connected with the main control chip module, the second switch tube is connected with the first switch tube, and wherein the PTC thermistor, the second switch tube, the rectifier tube and the current limit resistor connect in order, and wherein the other end of the PTC thermistor connects with a positive output end of the battery pack, and the other end of the current limit resistor connects with the positive electrode of the energy storage capacitor.

9. The switching method as claimed in claim 8, wherein the pre-charge circuit and the energy storage capacitor are connected in series and constitute an integral circuit.

10. The switching method as claimed in claim 8, wherein the pre-charge circuit is turned on by a single pulse sent from the main control chip module to charge the energy storage capacitor for the first time; and the main control chip module is not allowed to send the single pulse to the pre-charge circuit again after sending the single pulse.

11. The switching method as claimed in claim 8, wherein the charge circuit further comprises a third switch tube connected with the electronic switch module, the third switch tube connected with the main control chip module to receive a control signal sent from the main control chip module so as to switch on or switch off the electronic switch module.

12. The switching method as claimed in claim 11, wherein the electronic switch module comprises a control terminal connected to the third switch tube and a switch terminal electrically connected to the control terminal, and wherein when the third switch tube is switched on, the control terminal forms an energized circuit to switch on the switch terminal, so that the battery pack, the switch terminal and the energy storage capacitor are electrically connected and the battery pack starts to charge the energy storage capacitor.

13. The switching method as claimed in claim 11, wherein the pre-charge circuit charges the energy storage capacitor for the first time after being turned on by a single pulse sent from the main control chip module, and wherein when the main control chip module determines that voltage sampling values sampled respectively by the second sampling circuit and the first sampling circuit are the same, and a charging voltage of the energy storage capacitor is equal to a voltage of the battery pack, the main control chip module sends a control signal to the third switch tube.

14. The switching method as claimed in claim 8, wherein the main control chip module is integrated with pre-programmed power-on sequential logic, power-off sequential logic and drive signal logic.

\* \* \* \* \*